United States Patent
Chatta et al.

[11] Patent Number: 5,876,680
[45] Date of Patent: Mar. 2, 1999

[54] BIMETALLIC TUNGSTEN/PLATINUM CATALYSTS FOR LEAN-BURN EMISSIONS

[75] Inventors: Mohinder S. Chatta, Northville; Robert J. Kudla, Warren; T. E. Hoost, Redford, all of Mich.

[73] Assignee: Ford Global Technologies, Inc., Dearborn, Mich.

[21] Appl. No.: 662,178

[22] Filed: Jun. 12, 1996

[51] Int. Cl.⁶ .................................................. B01J 8/02
[52] U.S. Cl. .................................... 423/213.5; 423/213.2; 423/239.1
[58] Field of Search ................ 423/213.5, 213.2, 423/239.1

[56] References Cited

U.S. PATENT DOCUMENTS

| | | |
|---|---|---|
| 4,303,552 | 12/1981 | Ernest et al. ......................... 423/213.2 |
| 4,374,103 | 2/1983 | Gandhi et al. . |
| 4,389,382 | 6/1983 | Gandhi et al. . |
| 4,478,797 | 10/1984 | Diwell et al. ......................... 423/213.5 |
| 4,508,691 | 4/1985 | Adams et al. . |
| 5,399,324 | 3/1995 | Subramanian et al. . |
| 5,744,112 | 4/1998 | Irite et al. ............................. 423/236 |

FOREIGN PATENT DOCUMENTS

| | | |
|---|---|---|
| 0 070 736 | 1/1983 | European Pat. Off. . |
| 0 313 434 | 4/1989 | European Pat. Off. . |
| 3608635 | 9/1987 | Germany . |

*Primary Examiner*—Steven Bos
*Assistant Examiner*—Thomas G. Dunn, Jr.
*Attorney, Agent, or Firm*—Lorraine S. Melotik

[57] ABSTRACT

This invention is a bimetallic catalyst comprising tungsten oxide and platinum in critical amounts on a mostly γ-alumina support material. It is particularly optimal for use in lean-burn engine exhaust systems, including gasoline and diesel, where it efficiently reduces NOx in the exhaust gas.

4 Claims, 1 Drawing Sheet

2% Pt/Al2O3 Catalyst vs 2% Pt/0.25% WO3/Al2O3 Catalyst

BIMETALLIC TUNGSTEN/PLATINUM CATALYSTS FOR LEAN-BURN EMISSIONS

BACKGROUND OF THE INVENTION

A number of catalysts have been suggested to convert engine exhaust gas components like carbon monoxide (CO), hydrocarbons (HC's), and nitrogen oxides ($NO_x$) into other gases. The first two are desirably oxidized to $H_2O$ and $CO_2$ while the nitrogen oxides present in the exhaust gas, generally nitric oxide, are desirably reduced to $N_2$. These so called "three-way" catalysts achieve simultaneous efficient (conversion >80%) removal of CO, HC, and $NO_x$ when the fuel mixture of an internal combustion engine is slightly "rich" in fuel, i.e., in a narrow A/F ratio range between about 14.7 and 14.4, and the exhaust gas is slightly reducing. Such three-way catalysts are not efficient, however, in the reduction of $NO_x$ when engines are operated on the lean (reduced fuel) side where the A/F ratio is greater than 14.7, generally 19–35, and the exhaust gas is richer in oxygen. It is desirable, however, to operate engines on the lean side to realize a benefit in fuel economy, estimated to be in the range of 6–10%.

It would be desirable to have a catalyst system which would be effective in reducing nitric oxide emissions and also provide high conversions for hydrocarbons and carbon monoxide under lean-burn conditions (oxygen rich exhaust situations). Such a system would allow for improved fuel economy. In lean burn situations, considerable success has been achieved in the catalytic oxidation of unburned hydrocarbons (HC's) and carbon monoxide, (CO) but the reduction of the nitrogen oxides has proven to be a much more difficult problem. This is because the reducing substance (such as HC, CO or $H_2$) tend to react more quickly with the oxygen present in the exhaust gas than with the oxygen associated with nitrogen in $NO_x$.

Two-stage conversion systems have been proposed for treating lean-burn exhausts and involve an initial contacting zone directed to removal of NOx and a second contacting zone directed to removal of CO and HC's. For example, Subramanian et al in U.S. Pat. No. 5,399,324, commonly assigned with this invention, disclose a catalyst system for lean burn engines in which the exhaust flows over a first stage reducing catalyst of tungsten (0.1 to 3 weight percent) and then over a second stage oxidizing catalyst of, e.g., platinum. The two-stages as provided allow the tungsten to utilize HC in the exhaust to first reduce the $NO_x$ and then the resultant exhaust gas is oxidized over platinum to convert the HC and CO. One drawback of this system is that it is less than commercially desirable to use two-stage systems.

SUMMARY OF THE INVENTION

The present invention relates to a bimetallic catalyst for promoting oxidation-reduction reactions of the exhaust gases produced by an internal combustion engine. The bimetallic catalyst comprises about 0.1 and 2 weight percent tungsten oxide and about 0.5–4 weight percent platinum carried on a single support comprising mostly γ-alumina. The weight percents are each individually based on the weight of the support. The exhaust gas may be that generated by an automotive engine and the invention is adapted to be particularly useful in lean-burn situations, i.e., with oxygen-rich environments. In such gasoline engines situations, the air/fuel ratio is generally 19–27, while in diesel engines the air/fuel ratio is generally 19–40.

This invention according to another embodiment is directed to a method for the purification of lean-burn exhaust gases which comprises exposing the invention catalyst disclosed above to exhaust gases, particularly lean-burn engine exhaust gases.

We have found that the bimetallic catalyst of the present invention advantageously is able to convert the exhaust gases at lower temperatures and to a greater extent than that of such prior catalysts disclosed above.

DETAILED DESCRIPTION OF THE PREFERRED EMBODIMENTS

Figure 1:
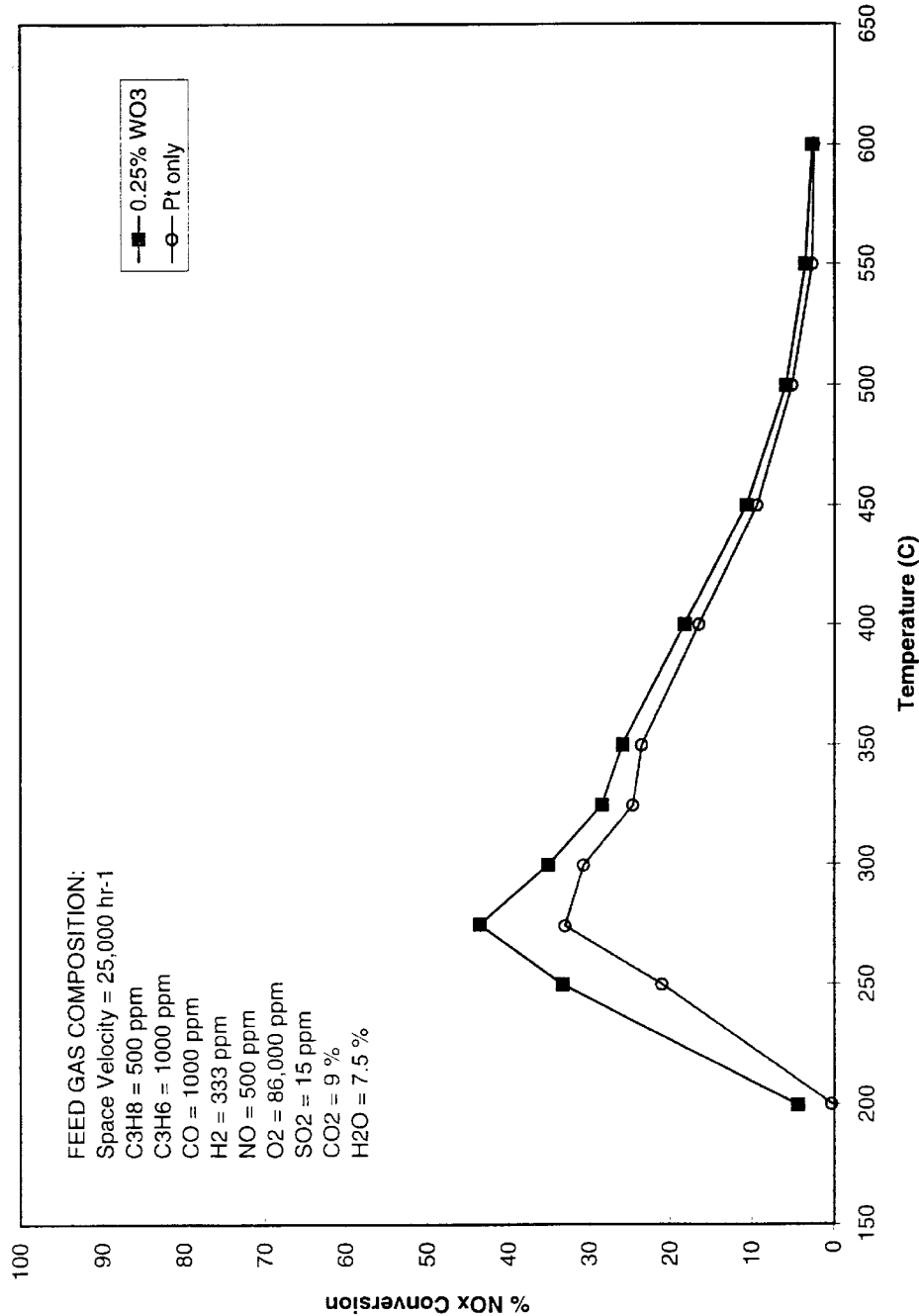
FIG. 1 schematically depicts the NOx conversion as a function of temperature for a platinum only catalyst (comparative catalyst)with a tungsten/platinum catalyst according to an embodiment of the present invention.

This invention is directed to a bimetallic catalyst for the purification of exhaust gases containing nitrogen oxides, carbon monoxide, and hydrocarbons. It is particularly suitable for use with lean-burn internal combustion engines, such as automotive gasoline and diesel engines.

The bimetallic catalyst comprises tungsten oxide and platinum loaded on a mostly γ-alumina support material (herein termed "γ-alumina support material"). By "mostly γ-alumima is meant that the support material comprises more than about 50% by weight, most preferably greater than 80%, and most preferably substantially all γ-alumima. In addition to the γ-alumima, however, if desired the γ-alumima support material may comprise other materials like cerium oxide, barium oxide, zirconium oxide, lanthanum oxide, titanium oxide, silica, and alpha-alumina. It may be included in the support or provided as a layer thereon. This support material comprising mostly γ-alumima is desired because it has high surface area, good adhesion and low tungsten/support chemical interaction.

The two required metals (tungsten and platinum) may be loaded onto the γ-alumina support material in any manner, several methods for providing metals on support materials being well known in the art. One particularly convenient method is by impregnating the γ-alumina support material with an aqueous or organic solvent solution comprising a soluble compound of the metal. Exemplary of such solvents are water, solution of alkalis like sodium hydroxide, ethanol, toluene, isopropyl alcohol, acetone, methylethylketone, butylacetate, and dimethylformamide. Exemplary of such soluble tungsten compounds are tungstates like ammonium metatungstate, metatungstic acid, tungstyl acetylacetonate, and tungsten hexahalides. Particularly preferred is ammonium metatungstate. In the same way, soluble platinum containing compounds may be employed to provide platinum on the support. For example, compounds like chloroplatinic acid, amino-Pt-nitrates and Pt-carboxylates are useful. Any tungsten or platinum compound which is soluble in an aqueous or organic medium and whose functional group is capable of being decomposed by heat to leave only tungsten or its oxide on the support material may be employed in this impregnation technique. Hence, such a compound is called a catalyst precursor compound. Other tungsten and platinum precursor compounds useful in this invention in addition to those listed above will be apparent to those skilled in the art in view of this disclosure.

According to the method of impregnation disclosed above, the "catalyst precursor compound" (exemplary of the tungsten and platinum compounds) is dissolved generally by simply mixing the compound into an aqueous or organic solvent to make a catalyst precursor solution thereof. A solution of the catalyst compound is generally further diluted for impregnation of the support. The catalyst precursor solution may also comprise a mixture of compatible organic solvents and/or catalyst compounds.

For useful application in an exhaust system, the washcoat will be carried on a substrate (mechanical carried) of a high temperature stable, electrically insulating material such as cordierite, mullite, etc. A mechanical carrier is preferably comprised of a monolithic magnesium aluminum silicate structure (i.e. cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the support material may be applied to the substrate and then impregnated with the precursor catalyst solution. Alternately, the impregnated washcoat may be applied to the substrate. Generally, the washcoat (support material) is provided first on the substrate. Optimally, the washcoat is provided on the substrate in an amount of between about 25% and 35% by weight based on the weight of the substrate (e.g., monolith). Still other ways of providing the catalyst product will be apparent to those skilled in the art in view of the present disclosure, the method not being critical to the present invention. Preferably, a tungsten-impregnated washcoat is made into a slurry and the monolith is coated with it. After drying, platinum is then deposited on the washcoat. Generally, for use in an exhaust system this impregnated washcoat is subjected to elevated temperatures to decompose and eliminate the functional group of the catalyst precursor. It may be further subjected to calcining.

If the heating is carried out in the air, the tungsten compound decomposes and forms tungsten oxide. If, on the other hand, the heating is carried out in a reducing atmosphere, the tungsten compound may be reduced to elemental tungsten. When the catalyst is placed in use, oxygen present in the exhaust gas will oxidize the tungsten to tungsten oxide. In the case of platinum, it is oxidized to platinum oxide which at high temperatures decomposes to platinum and oxygen. Thus it often exists as a mixture of platinum and its oxides.

The support material is loaded such that the amount of tungsten oxide is between 0.1 and 2% and the amount of platinum is between 0.5–4% by weight, each based on the weight of the support. Preferably the tungsten oxide comprises about 0.1–0.5 wt % and the platinum comprises about 1.5–2.5, mostly preferably about 2% wt.

For testing of the present invention, a granular support is mixed with a catalyst precursor solution and stirred at an elevated temperature generally of about 75°–120° C. to evaporate the solvent. The impregnated support material is then heated to decompose and eliminate the functional group from the mixture, such as by heating at 320° C. for one hour and thereafter for four hours at 600° C. The tungsten and platinum may be impregnated into the washcoat support from a single solution or in sequence, either being impregnated first.

It may also involve multiple impregnations. For laboratory evaluation of the catalyst, it is packed in a glass tube sealed with quartz glass wool and simulated exhaust gas is then passed through the tube.

This present invention bimetallic catalyst is particularly useful to convert exhaust gases from a lean-burn engine, especially automotive engines. Gasoline lean-burn engines are operated for at least part of their operation in an air rich ratio, i.e., where the air/fuel ratio is 19–27. For diesel engines the air/fuel ratio is generally 19–40 We have unexpectedly found that the (single-stage) bimetallic tungsten/platinum catalyst has excellent ability to reduce NOx in such lean-burn situations at a much lower temperature than a comparable two-stage tungsten-platinum catalyst system of U.S. Pat. No. 5,399,324. In one example (Example 14) we have found that the present invention catalyst can convert 68% more of the NOx than a comparable two-stage system (using the same amount of tungsten and platinum), even when the catalyst temperature is 20° C. lower than that of the two-stage system. This feature of the present single-stage bimetallic catalyst is advantageous and important because it allows conversion of NOx much sooner after start up of the engine so that less of these materials are released during cold-start to the atmosphere.

While not wishing to be bound by theory, it is believed that the loading of the tungsten and platinum on one support where the tungsten and platinum are in contact with one another causes increased acidity of the alumina (from the tungsten) and enhanced hydrocarbon cracking efficiency, which produces hydrocarbons species more suitable for the conversion of the NOx. This factor results in lower conversion temperature and greater conversion of the NOx. In addition, as compared to the two-stage catalyst of Subramanian et al discussed above, the first stage acts as a heat sink, delaying the warm up of the platinum catalyst. We believe our (single-stage) bimetallic catalyst overcomes this problem and as a result has excellent cold-start conversion in addition to having excellent conversion over a wide range of lean-burn and stoichiometric A/F engine operation. Neither the accuracy nor the understanding of this theory is necessary however for practice of the present invention.

EXAMPLE 1

Ammonium metatungstate, is employed to deposit, by incipient wetness, 0.25% $WO_3$ by weight on 10 grams of 40–60 mesh γ-alumina (Alumica-C). The sample was dried at room temperature overnight, at 110° C. for one hour, and then calcined at 400° C. for three hours.

Tetramine platinum (ll) nitrate, 5 g, is dissolved in 100 ml water and two 8 ml portions of the solution are placed in two separate beakers. The solutions are diluted to 14 ml each and one is employed to impregnate 10 g alumina-C (40–60 mesh) as a comparative example and the other to impregnate the above described tungsten-impregnated alumina (according to an embodiment of the present invention). The platinum loading in each sample is 2% by weight. Both the samples are allowed to stay at room temperature overnight, dried at 110° C. for 1 hour, and then calcined at 500° C. for five hours.

TEST PROCEDURES

The catalysts of the examples are placed in a quartz flow reactor and characterized under lean-burn conditions. Gases are blended to form a simulated lean-burn exhaust gas (of either a gasoline or diesel engine) in a manifold by means of mass flow controller. The space velocity and the simulated exhaust gas composition are listed below. The gases flow through the reactor and the post-catalyst gases later flow to an analytical train to determine the extend of reactions on various components of the gas, especially the NOx.

FEED GAS COMPOSITION:

Space velocity=25,000 hr$^{-1}$ $C_3H_8$=500 ppm $C_3H_6$=1000 ppm

CO=1000 ppm $H_2$=333 ppm

NO=500 ppm $O_2$=86,000 ppm $SO_2$=15 ppm $CO_2$=9%

$H_2O$=7.5%

The results are shown in FIG. 1. The maximum conversion of $NO_x$ on $Pt/Al_2O_3$ (control sample) is 35% while on the tungsten-modified composition, it is 46%. (By control samples is meant herein an example for comparative purposes, not according to an embodiment of the present invention.) It can be seen from the graph that including tungsten with the platinum improves the NOx conversion efficiently. Particularly, the graph shows that a present embodiment provides significantly improved NOx conversion at the lower temperatures of 200° C. as are experienced during start-up of a diesel engine. As is known to those skilled in the art, diesel engines are also lean-burn in that the air/fuel ratio is generally 19–40. Hence the present invention Pt/W catalysts also provide advantages for such diesel applications to reduce cold-start emissions.

EXAMPLE 2

Titanium tetrabutoxide solution is prepared in isopropyl alcohol and is employed to deposit 1.2% by weight $TiO_2$ on 10 g of γ-alumina (40–60 mesh, Alumina-C). The sample is allowed to stay overnight in air at room temperature, dried at 100° C. for one hour and then calcined at 400° C./3 hrs. The impregnation of tungsten/platinum and platinum on to the above $T_iO_2$/alumina is carried out as described in Example 1. The evaluation of the two samples as described in Example 1, shows that NOx conversion over tungsten-modified sample is 43% while over the control sample it is only 34%.

EXAMPLE 3

Zirconium tetrapropoxide solution (70% is propanel, 1 ml) is dissolved in 6.5 ml isopropyl alcohol and is employed to impregnate 10 g of γ-alumina (Alumina-C, 40–60 mesh). The mixture is heated at 80° C. for 26 hours and then calcined at 400° C. for 3 hours.

Ammonium metatungstate is employed to deposit 1% by weight of $WO_3$ on 5 g of the above sample. This tungsten-modified and the control $ZrO_2/Al_2O_3$ samples are impregnated with platinum as described in Example 1. The samples are evaluated or described in Example 1. The $NO_x$ conversion for the tungsten-modified sample is 43% while for the control sample it is 34%.

EXAMPLE 4

γ-alumina (Alumina-C, 40–60 mesh, 10 g) is treated with lanthanum nitrate solution, dried, and calcined at 400° C./4 hours to deposit 2.3% $LA_2O_3$ by weight. Starting from this material, the tungsten-modified and the control samples are prepared and evaluated as described in Example 1. the $NO_x$ conversion for the tungsten-modified sample is 41% while for the control sample it is 34%.

EXAMPLE 5

The alumina-support is treated with cerium nitrate solution to deposit 2.1% ceria on alumina as described in Example 4. The preparation and evaluation of the catalyst samples are carried out as described in Example 1. The $NO_x$ conversion for the tungsten-modified is 43% while for the control sample is 35%.

EXAMPLE 6

The catalyst preparation and evaluation are carried out or described in Example 1, except that 0.5% $WO_3$ loading is employed. The $NO_x$ conversion on the tungsten-modified sample is 45% while on the control-sample it is 35%.

EXAMPLE 7

The catalyst preparation and evaluation are carried out as described in Example 1 except that the $WO_3$ beading is 2% by weight of alumina. The $NO_x$ conversion on the tungsten-modified sample is 40% while on the control sample it is 35%.

EXAMPLE 8

The catalyst preparation and evaluation are carried out as described in Example 1, except that the $WO_3$ loading is 3% by weight of alumina. The $NO_x$ conversion on the control sample is 35% while on the tungsten modified sample it is 37%.

EXAMPLE 9

The catalyst preparation and evaluation are carried out as described in Example 1, except that $WO_3$ loading is 4% by weight of alumina. The $NO_x$ conversion the control sample is 35% while on the tungsten containing sample it is 33% only.

EXAMPLE 10

The experiment was carried out as described Example 1, except the platinum loading is double (4% by weight) as described therein. The maximum conversion of $NO_x$ on the control sample is 37% while on the tungsten-modified sample it is 47%.

EXAMPLE 11

γ-Alumina (Alumina-C, 40–60 mesh, 10 g) is impregnated with platinum as described in Example 1. Half of this sample (5 g) is treated with ammonium metatungstate solution to deposit 0.25% $WO_3$ by weight. Both the samples are calcined at 500° for five hours. The catalysts are evaluated or described in Example 1. The maximum $NO_x$ conversion on $Pt/Al_2O_3$ is 35% while on the tungsten-modified composition, it is 44%

EXAMPLE 12

Measured amounts of tetramine platinum nitrate solution and that of ammonium metatungstate (Example 1) are mixed in a beaker. The mixture is employed to deposit 2% Pt and 0.25% $WO_3$ by weight on Alumina-C (40–60 mesh). The sample is allowed to stay at room temperature overnight, dried at 110° C. for 1 hour, and then calcined at 500° C. for five hours. This sample and the Pt/Al$_2$O$_3$ sample from Example 1 are evaluated as described in Example 1. The NO$_x$ conversion on this sample is 45% while on the Pt/Al$_2$O$_3$ sample is 35%.

EXAMPLE 13

The catalyst samples are prepared and evaluated as described in Example 1, except that alumina contained 1% silica by weight. The NO$_x$ conversion Pt-catalyst is 34% while on the Pt/W-catalyst, it is 44%.

EXAMPLE 14

The WO$_3$/Al$_2$O$_3$ and Pt/Al$_2$O$_3$ samples are prepared as described in Example 1. One gram of WO3/Al$_2$O$_3$ is placed in the reactor tube followed by one gram of Pt/Al$_2$O$_3$ sample. The evaluation is carried out as described in Example 1 by maintaining the same space velocity. The maximum NO$_x$ conversion is 28% at 295° C. The Pt/WO$_3$/Al$_2$O$_3$ catalyst is tested under the same condition; the maximum NO$_x$ conversion is 47% at 276° C.

EXAMPLE 15

Two WO$_3$/TiO$_2$/Al$_2$O$_3$ and Pt/TiO$_2$/Al$_2$O$_3$ are prepared as described in Example 2. The catalyst (Pt/WO$_3$/TiO$_2$/Al$_2$O$_3$ and WO$_3$/TiO$_2$/Al$_2$O$_3$+Pt/TiO$_2$/Al$_2$O$_3$) are evaluated as described in Example 14. The maximum NO$_x$ conversion for the two-stage catalyst is 29% at 297° C. while for Pt/WO$_3$/TiO$_2$/Al$_2$O$_3$ catalyst it is 46% at 276° C.

EXAMPLE 16

The samples (WO$_3$/ZrO$_2$/Al$_2$O$_3$, Pt/ZrO$_2$/Al$_2$O$_3$ and Pt/WO$_3$/ZrO$_2$/Al$_2$O$_3$) are prepared as described in Example 3. The catalysts are evaluated as described in Example 14. The maximum NO$_x$ conversion for the two-stage catalysts is 27% at 296° C. while for Pt/WO$_3$/ZrO$_2$/Al$_2$O$_3$ it is 45% at 276° C.

We claim:

1. A process for the removal of nitrogen oxides, carbon monoxide, and hydrocarbons from exhaust gases generated by an internal combustion engine, said process comprising the steps of:

exposing said exhaust gases under conditions effective for the removal of said nitrogen oxides, carbon monoxide, and hydrocarbons to a single-stage bimetallic catalyst in the exhaust gas system of an internal combustion engine operated under lean-burn conditions wherein the engine's air/fuel ratio is between about 19 to 40, said catalyst consisting essentially of:

(a) porous support material comprising mostly γ-alumina;
   (b) 0.1 to 0.5 wt % tungsten oxide and 0.5 to 4 wt % platinum deposited on said support, the amount of said metals being individually based on the weight of said support material.

2. The process of claim 1 wherein said tungsten oxide comprises about 0.1–0.5 wt. % and the platinum comprises about 1.5–2.5 wt. %.

3. The process according to claim 1 wherein said support is substantially all γ-alumina.

4. The process according to claim 1 wherein said support comprises materials selected from the group consisting of cerium oxide, barium oxide, zirconium oxide, lanthanum oxide, titanium oxide, and alpha-alumina.

* * * * *